Patented Oct. 26, 1954

2,692,865

UNITED STATES PATENT OFFICE 2,692,865

MODIFIED PHENOLIC RESIN

Thomas G. Harris, Coopersburg, Pa., assignor to Catalin Corporation of America, a corporation of Delaware No Drawing. Application June 26, 1951, Serial No. 233,680

2 Claims. (Cl. 260—2.1)

This invention relates to modified phenolic resins and the method of making them. The invention relates particularly to beta-propiolactone modification of phenol and formaldehyde condensation products and like modification of other phenolic resins.

The lactones are to be distinguished from ethylene oxide and other epoxy compounds, the use of which in modifying phenol aldehyde resins is described in my copending application Serial No. 201,882 filed December 20, 1950, for Epoxy Modified Phenolic Resin. A difficulty arises when it is attempted to follow the general procedure of the said copending application but with the substitution of the lactone for the epoxy compound. The lactone, when used in proportion that is large or equivalent to the phenol aldehyde condensation product and with the usual small catalytic proportion of an alkali, gives the desired modification only to a limited extent. The unused lactone then enters into undesired side reactions with water, methanol introduced with the commercial solution of formaldehyde, or other reactive compound that may be in the mixture. The product in such a case is a liquid or soft resin.

The present invention provides a solution of this difficulty. It provides a method in which the lactone is reacted in various proportions up to approximately stoichiometric with the phenol formaldehyde condensation product. The invention provides for the production at will of either a solid modification product or a liquid product usually of lesser modification by the lactone. The solid product is useful as a molding plastic or powder, an ion exchange resin, or a plasticizer intermediate. The liquid product is useful in making cast resins, as an adhesive, or as a plasticizer for other resins.

Briefly stated, the invention comprises lactone modified phenol aldehyde condensation products and the method of effecting the lactone modification. In effecting the modification to the advanced stage desirable for many purposes, the invention comprises adding an alkali in relatively large amount. The alkali may be added at the beginning of the modification or as required to neutralize acidity as it develops, during the modification, and maintain the pH at all times at a level of at least 4 and, when a solid resin is desired, preferably at or above 7, until the modification is effected. In one embodiment, the invention comprises esters of the modified product, as, for example, esters of a monohydric or polyhydric alcohol with the lactone modified phenol and aldehyde condensation product.

As to the method of effecting the lactone modification, the selected phenol and selected aldehyde are condensed in accordance with usual technique in the condensation of phenols with aldehydes. In such condensation, there is ordinarily employed either alkali or acid catalyst.

For my modification with lactone, the usual condensation of the phenol and the aldehyde is interrupted as at the stage when the content of free aldehyde ceases to fall rapidly and before the subsequent rapid onset of viscosity or thickening of the mass which accompanies continued condensation. This interruption is effected by introducing the selected lactone and alkali in amount if any required to establish the pH above 7. Additional alkali is added from time to time if required to maintain the pH at a level above 4 at all times during the modification of the lactone.

Under such favorable circumstances, the lactone enters the hydroxyl group of the phenol. This reaction creates in the modified product a carboxyl group which reacts with the alkali added.

So long as the proportion of alkali is adequate, there is an absence of extensive and undesired side reactions. In fact the composition may be slightly acidified by the addition of acid in making liquid or cast resins.

This reaction which causes the desired modification occurs at room temperatures. In some instances, warming, as for half an hour or so under refluxing or at a somewhat lower temperature is employed, to promote modification at a commercially satisfactory rate.

The reaction may be represented by the following equation, for the modification of the phenol formaldehyde condensation product with beta-propiolactone:

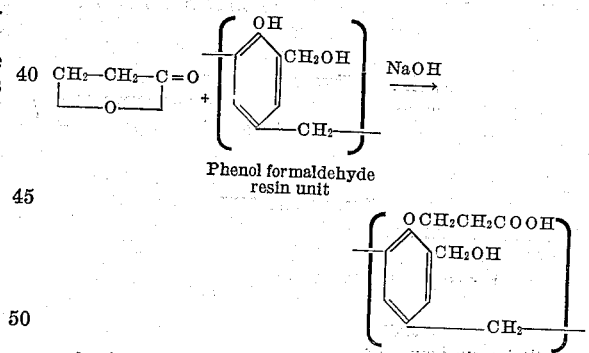

As to materials used, the phenol must be one that is reactive with aldehyde under the usual conditions of phenol and aldehyde condensation and one that in the form of its salts, such as the sodium salt, is soluble in water. Examples of phenols that meet these requirements and that may be used satisfactorily are phenol, resorcinol, p,p'-dihydroxydiphenyl propane, metacresol, pyrogallol and guaiacol. Some of these are monohydric and others polyhydric phenols.

In this equation, equivalent proportions are used. The general average formula of the mixed product, for various proportions of lactone used may be represented as

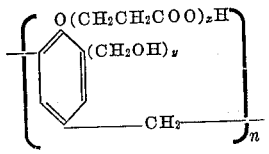

The value of $y$ in the above formula unit is dependent upon the initial mol ratio of phenol to aldehyde and upon the type of catalyst employed in the condensation step. $y$ represents a value between 0 and 1; $n$, an integral number at least 1 (for the monomer) and considered to be 3 to 20 corresponding to the number of the monomer units (inside the parenthesis) combined in the polymer constituting the resinous composition; and $x$, a number not greater than 1. While $n$ represents an integral number for any specific compound in my product, it will be understood that in all such polymeric resinous materials there is a mixture of various compounds, so that the average value of $n$ is not necessarily integral for the entire mixture. In any case the average value of $n$ in my product is considered, as stated, to be not less than 3. In the product in which all the phenolic hydroxyls have been reacted with beta-propiolactone, $x$ is 1. Such a product may be considered a high molecular weight polyacid. A low value of $y$ in the formula minimizes the possibility of inter- or intra-esterification of the methylol group ($CH_2OH$) and the acid group (—COOH). The products from Examples 1, 2, and 3 later herein, while thermoplastic, can conceivably thermoset on their own accord at higher temperatures through this mechanism.

The aldehyde used is one that is water soluble and reactive with phenol under the usual conditions of aldehyde and phenol condensation. I have used to advantage various aldehydes of this class, including formaldehyde, paraformaldehyde, or other formaldehyde polymer, either with or without the inclusion of the methanol which occurs in some commercial formaldehyde solutions to the extent of about 10%; furfural; and glyoxal.

The lactones that are useful in the present composition and process are those that are miscible with the aqueous phenolic resin mix. The beta-lactones are preferred because of good reactivity under my conditions. Examples of these that are satisfactory for my purpose are beta-propiolactone, beta-butyrolactone, and beta-isobutylrolactone.

The alkali used in the modification serves actually as a reactant. I may use any one of the inexpensive alkalies such as an alkali metal hydroxide, calcium hydroxide, and amines of which examples are monoethylamine in solution and quaternary ammonium compounds, as, for instance, benzyl trimethyl ammonium hydroxide. It will be understood that these alkalies may be replaced for sodium hydroxide in the equation above. If R is the cation of the alkali, R may be substituted for Na in the equation and Na or R for the acid hydrogen in the formula. The formula including the acid hydrogen is used by me for convenience as it represents my resinous product after acidification.

I find no advantage in using generally the more expensive alkalies over using sodium hydroxide. As a result I use sodium hydroxide as the alkali except in the preparation of certain cast resins where other alkalies are used for their known advantages, as in imparting to the cast resin certain special properties such as improved light transmission.

Water is useful in the reaction mixture. It promotes ionization of the phenol in the presence of the alkali and for that reason promotes reaction of the lactone with the phenolic hydroxyl group.

Other materials ordinarily introduced into plastics for their known effects may be used in my modified product as, for example, pigments, fillers, and the like.

As to proportions of materials, these are expressed herein as mols per mol of the selected phenol unless otherwise specifically stated.

The proportion of the selected aldehyde to the selected phenol may be any that is conventional in the manufacture of phenol and aldehyde condensation products as for instance 0.6 to 3.5 mols of the formaldehyde to 1 of the phenol. When the phenol selected is monohydric then the ratio of the aldehyde, particularly when the aldehyde is formaldehyde, is ordinarily within the range 0.8 mol to 2.5 mols for 1 of the phenol.

PROPORTION OF THE BETA-LACTONE AND TIME OF INTRODUCTION INTO THE CONDENSATION PRODUCT

The beta-lactone is used in the proportion of about 0.1 to 1 mol for each mol of the phenol when monohydric. When less than 0.1 mol of the lactone is used, the modification produced is not sufficiently extensive. When the proportion of the lactone is more than 1 mol, then there is an excess which does not react with the phenol according to the principal and desired reaction given above. Larger amounts than 1 mol of the lactone may be used if there is no objection to by-products in the finished resin. While I use ordinarily no substantial excess of the lactone over that which I desire to have in the finished modified product, I may use an excess ranging up to 50% or so of the lactone above the proportion to be reacted. When the phenol is polyhydric, then the molecular proportion of the lactone is increased to correspond, as, for example, to an amount within the range 0.1 mol to 2 mols with a dihydric phenol. With a trihydric phenol, the proportion of the lactone may be as high as 3 mols to 1 of the phenol in addition to any excess of the lactone that may be added.

The effect of the proportion of the lactone on the properties of castings prepared from the modified resin is shown in the table below, the phenol and formaldehyde having been used in making the original condensation product in the ratio of 1 mol to 2.32 respectively and sodium hydroxide being used in the modification step in the proportion of 3% of the weight of the phenol. In this table and elsewhere the yield is expressed as parts by weight for 1 part of phenol.

| Mols beta-propiolactone added per mol phenol | pH of the modified system | Yield | Time of Cure at 90° C. | Rockwell Hardness of casting |
|---|---|---|---|---|
| | | | Hrs. | |
| 0.09 | 6.22 | 1.88 | 42 | +71 |
| 0.18 | 5.35 | 1.92 | 42 | +35 |
| 0.27 | 5.07 | 1.98 | 42 | 0 |
| 0.36 | 4.90 | 2.04 | 42 | −10 |

This effect on finished castings is shown again in the next table, the basic resin selected here for modification having been prepared from p,p'-dihydroxydiphenylpropane as the phenol and formaldehyde in the mol ratio of the phenol to formaldehyde (methanol-free) 1:3.65. The condensation was effected for seven minutes at reflux. The catalyst was sodium hydroxide (6.0% by weight on the phenol). The modification by the lactone was made at end of the initial alkaline condensation.

| Mols beta-propio-lactone added per mol phenol | Pouring Viscosity | Time of Cure at 90° C. | Rockwell Hardness | Light Transmissibility |
|---|---|---|---|---|
| | | Hrs. | | |
| 0.00 | not pourable. | | | |
| 0.24 | normal | 24 | +50 | Heavily translucent. |
| 0.48 | sl. thin-normal. | 24 | +3 | Lightly translucent. |
| 0.72 | ___do___ | 24 | −19 | Transparent. |

Light transmission is stated herein, in the order of increasing transmissibility as follows:

Opaque
Poorly opaque
Heavily translucent
Translucent
Lightly translucent
Poorly transparent
Transparent (sl. haze)
Transparent The effect of the extent of modification on finished castings is illustrated still further by the succeeding tables.

Phenol-formaldehyde cast resin. Mol ratio of phenol to formaldehyde (methanol stabilizer) 1:2.32. Condensation—seventeen minutes at reflux. Catalyst—sodium hydrixide (3% by weight on phenol). Modification—after weak acidification.

| Mols beta-propio-lactone added per mol phenol | Pouring Visc. | Yield | Time of Cure at 90° C. | Rockwell Hardness of Casting | Light transmissibility |
|---|---|---|---|---|---|
| | | | Hrs. | | |
| 0.22 | almost normal. | 1.95 | 72 | +48 | heavily translucent. |
| 0.45 | sl. thin | 2.07 | 72 | −4 | translucent. |
| 0.67 | normal | 2.18 | 72 | −37 | transparent. |
| 0.90 | | 2.28 | 72 | −80 | Do. |

Phenol-formaldehyde cast resin. Mol ratio of phenol to formaldehyde (methanol stabilizer) 1:2.32. Condensation—seventeen minutes at reflux. Catalyst—sodium hydroxide (3% by weight on phenol). Modification—at end of condensation. Glycerine present. The summary and results follow.

| Mols beta-propio-lactone added per mol phenol | pH of Modified System | Yield | Time of Cure at 90° C. | Rockwell Hardness of Casting | Light transmissibility |
|---|---|---|---|---|---|
| | | | Hrs. | | |
| 0.09 | 6.23 | 1.85 | 42 | +52 | poorly transparent. |
| 0.18 | 5.40 | 1.93 | 42 | −16 | transparent (sl. haze). |
| 0.27 | 5.06 | 1.98 | 42 | −39 | transparent. |
| 0.36 | 4.96 | 2.07 | 42 | too soft to measure. | Do. |

Phenol-formaldehyde cast resin. Mol ratio of phenol to formaldehyde (methanol stabilizer) 1:2.32. Condensation—seventeen minutes at reflux. Catalyst—sodium hydroxide (3% by weight on phenol). Modification—at pouring stage. Secondary dehydration—thirty minutes. Glycerine present. The summary and results follow.

| Mols beta-propio-lactone added per mol phenol | Pouring Visc. | Yield | Time of Cure at 90° C. | Rockwell Hardness of Casting | Light transmissibility |
|---|---|---|---|---|---|
| | | | Hrs. | | |
| 0.00 | sl. thin | 1.93 | 44 | +12 | opaque. |
| 0.06 | ___do___ | 1.93 | 44 | +8 | very heavily translucent. |
| 0.12 | ___do___ | 1.99 | 44 | 0 | Do. |
| 0.21 | ___do___ | 2.05 | 44 | −26 | lightly translucent. |
| 0.30 | thin | 2.10 | 44 | −58 | transparent (sl. haze). |
| 0.39 | v. sl. thin | 2.17 | 44 | too soft to read. | transparent. |

While these and the other ones of the extensive tables and examples herein are not necessary for an understanding of the invention, they should be of interest to the technical worker in this field.

It can be concluded from the preceding tables that, as the amount of beta-propiolactone increases, usually (1) The pH of the system decreases,
(2) the pouring viscosity decreases,
(3) the yield increases,
(4) the hardness of casting is lower per unit curing time, and
(5) the light transmissibility of casting becomes greater.

The thinning of the viscosity is of particular value where intricately designed molds are employed. Another suggested use based on this property is to prepare novolaks of better flow properties and color.

When phenol and formaldehyde, for example, are heated in the presence of an alkaline catalyst, methylol phenols form almost immediately. These methylol phenols act as nuclei for subsequent condensation. The presence of a large number of nuclei early in the reaction favors the formation of many relatively short chains of approximately the same length. Therefore, when beta-propiolactone is introduced in one portion in sufficient amount to react completely with the phenolic hydroxyls, the product originating consists of chains, the molecular weights of which fall within a relatively narrower range than if addition is performed gradually or intermittently. A similar effect to the latter can be obtained by mixing resins which had previously been modified after different times of condensation.

The chains forming as the dimethylol phenols condense gradually increase in length as the time of condensation is prolonged. This accounts for the different products formed when variations in the details of addition are employed.

Furthermore, as condensation proceeds the percentage of free formaldehyde decreases (rapidly at first) and finally attains a value which changes only very slowly with further condensation, as shown in the table.

1,000 gms. phenol.
2,000 gms. formaldehyde solution (aqueous, 37%).
120 gms. sodium hydroxide (aqueous, 25%).

| Time from first application of heat, mins. | Time from start of reflux, min. | Percentage free formaldehyde (by wt.) | Remarks |
|---|---|---|---|
| 0 | | 22.5 | |
| 5 | | 23.0 | |
| 10 | | 22.9 | |
| 15 | | 22.7 | |
| 20 | | 19.8 | |
| 25 | 0 | 10.7 | The addition of the beta-propiolactone is usually made beyond this point. |
| 30 | 5 | 6.4 | |
| 35 | 10 | 4.9 | |
| 40 | 15 | 4.1 | |
| 45 | 20 | 3.7 | |
| 50 | 25 | 3.4 | |
| 55 | 30 | 3.3 | |
| 60 | 35 | 2.8 | |
| 65 | 40 | 3.3 | |
| 70 | 45 | 3.3 | |
| 75 | 50 | 3.4 | |
| 80 | 55 | 3.3 | |
| 85 | 60 | 3.3 | |

The exact proportion at which the free formaldehyde content will begin to level off is influenced by a number of factors as, for example, the phenol-formaldehyde mol ratio, the amount of catalyst, and other factors as illustrated in the following table.

[Catalyst: Sodium hydroxide (3% based on phenol)]

| Phenol formaldehyde mol ratio | Percentage free formaldehyde (by wt.) levels off at— |
|---|---|
| 1:1.8 | 0-1 |
| 1:2.9 | 5-7 |
| 1:3.5 | 8-10 |

[Phenol formaldehyde mol ratio:—1:2.32]

| Sodium hydroxide catalyst based on phenol, percent | Percentage free formaldehyde (by wt.) levels off at percent HCHO |
|---|---|
| 1.5 | 5-8 |
| 3.0 | 3-5 |
| 6.0 | 1-3 |

The beta-propiolactone is usually introduced after the free formaldehyde content has approached or reached the leveling off value and before the rapid onset of viscosity of the resin or thickening has begun.

500 gms. phenol.
1,000 gms. formaldehyde solution (37%, aqueous, methanol-free).
60 gms. sodium hydroxide solution (25%, aqueous).

| Time from first application of heat, min. | Time from start of reflux, min. | Temperature, °C. | Viscosity (relative) | Remarks |
|---|---|---|---|---|
| 18 | 0 | 101.0 | 46.9 | |
| 24 | 6 | 100.4 | 48.4 | |
| 31 | 13 | 99.6 | 48.9 | |
| 36 | 18 | 99.5 | 49.7 | |
| 42 | 24 | 99.4 | 51.7 | |
| 48 | 30 | 99.3 | 54.4 | |
| 54 | 36 | 99.1 | 60.2 | |
| 58 | 40 | 99.1 | 67.2 | |
| 60 | 42 | 99.1 | 74.5 | The beta-propiolactone is usually added before this point is reached. |
| 65 | 47 | 99.0 | 105.0 | |
| 69 | 51 | 99.0 | 173.0 | |

The average molecular weight of the product will naturally be greater, the longer the condensation time preceding the beta-propiolactone addition.

The influence of the proportion of the lactone on the pH to which the system falls during the modification, no additional alkali being introduced over that employed in the condensation step, is shown in the following table. The resin here was a phenol-formaldehyde resin condensation product at a mol ratio of 1:2.21 in the presence of sodium hydroxide (3% by wt. on phenol) and condensed fifteen minutes at reflux before modification.

| Mols beta-propiolactone added per mol phenol | pH of the modified solution |
|---|---|
| 0.0 | 8.82 |
| 0.3 | 4.85 |
| 0.6 | 4.38 |
| 1.0 | 4.05 |
| 2.0 | 4.18 |
| 5.0 | 4.37 |
| 10.0 | 4.42 |

It will be observed that the lactone in excess of 1 mol has no effect in further lowering of the pH and actually caused a slight increase in this set of preparations.

EFFECT OF PROPORTION OF ALKALI USED

As to the proportion of alkali, this varies as stated in accordance with the extent of modification desired. When it is desired to make a solid product, I use the alkali in amount to maintain the pH on the alkaline side (above pH 7) at all times during the modification and that requires about 1 mol of the sodium hydroxide for each mol of the lactone to be reacted with the phenol. When the effect of the extensive modification or a solid product is not desired, then the proportion of alkali as well as of lactone may be lowered, as, for instance, to any proportion within the range 0.1–1 mol. In making liquid or cast resins, I may use the alkali in amout to maintain the pH during the lactone modification at 4 or above.

EFFECT OF WATER ON THE MODIFICATION

The complete removal of water from a resinous system before modification is usually not only extremely difficult, further condensation occurring, but impractical from an economical standpoint. Furthermore, the presence of water has been found to be desirable since it (a) Provides an ionization medium directing the reaction toward the phenolic hydroxyl groups under basic conditions, and
(b) Aids in the dissipation of the exothermic heat providing thereby adequate control.

THE METHOD IN GENERAL

In making my new resin, phenol and formaldehyde are reacted (condensed) in the ratio of 1 mol of the former to about 0.8–2.5 mols of the latter, with an alkali or other suitable catalyst at a temperature between 50° C. and the reflux temperature of the mixture, and until the free formaldehyde content has ceased to fall rapidly. When that stage has been reached, while the phenol formaldehyde condensation product is in a water soluble form as shown in Example 1, and before the rapid onset of viscosity that comes when the condensation is continued, beta-propiolactone is introduced in amount ranging from 0.1 to 1 mol or somewhat more, the exact proportion of the lactone used depending upon the specific properties desired in the finished product, the larger the proportion used the greater the modification of the phenolic resin and an excess of the lactone being permissible. The beta-propiolactone may serve as the sole acidifying agent as the reaction progresses or further acidification may be made by the addition of lactic or other acid commonly used as an acidifying agent of phenol-formaldehyde compositions. After modification, the product if solid is separated in usual manner as by filtration. If liquid, the product is dehydrated by evaporation, usually under reduced pressure, until the removal of unbound water practically ceases. For casting the liquid resin is poured into a mold and cured at a temperature of 75° to 90° C. for the time determined by simple tests to be necessary to effect the cure, as, for example, for about 1 day to 5 days.

When the phenol used is one such as a dihydroxy diphenyl alkane, with an active hydroxy group on each of the benzene rings, a larger proportion of the formaldehyde may be used as illustrated in Example 3.

In making solid products by this method a large proportion of alkali is introduced, to maintain the pH at about or above 7.

Other variations are the addition of pigments, a polyhydric alcohol such as glycerine, a monohydric alcohol such as methanol, or salts.

Another phenol, as, for example, p,p'-dihydroxydiphenylpropane or any other one of those listed above may be substituted for the phenol in the process for making these modified resins.

Modifications of the above procedure which have been used for special purposes include warming the acidified mixture before the addition of the beta-propiolactone, acidification and also partial dehydration of the phenol and formaldehyde mix before the beta-propiolactone addition, acidification and dehydration of the said mix to increased viscosity before the lactone addition, and acidification and dehydration to the selected condition of viscosity before the beta-propiolactone addition followed by a secondary dehydration after the addition.

SOLID RESINS

To make the solid or more completely modified resinous composition, a large proportion of the lactone and of alkali are used. Examples of suitable proportions are 1 mol each of sodium hydroxide and beta-propiolactone for each mol of phenol. In this making of the solid material, I may also introduce an added electrolyte such as sodium chloride or other known electrolytic precipitant of resins of this general class from solution, to aid precipitation of the modified resin from solution.

The invention will be further illustrated by description in connection with the following specific examples of the making of solid resins, the "mix" used being tabluated.

*Example 1*

Phenol _____ 94.11 gms. (1.00 mol)
Formaldehyde (36.4% by wt. aqueous solution, methanol-free) _____ 191.42 gms. (2.32 mol)
Sodium hydroxide _____ 11.29 gms. (0.071 mol)

This mix is heated to reflux and condensed for fifteen minutes at reflux temperature. A golden yellow, clear solution is formed. This is cooled to 20° C. and diluted with 941.1 gms. (52.2 mols) of water. The solution becomes cloudy. 176 gms. (1.10 mol) of 25% by weight aqueous solution of sodium hydroxide are added with stirring and cooling, the temperature being held at 20° C. 79.2 gms. (1.09 mol) of beta-propiolactone are then gradually introduced, the temperature again being held at approximately 20° C. Clouding begins when approximately 80% of the beta-propiolactone has been added. The product is very milky and white but still alkaline to litmus. This is acidified with 111.4 gms. (1.21 mol) of formic acid solution (50% by weight in water) and the precipitate allowed to settle. The precipitate is collected on a filter, washed, and dried.

The product is a white powder. The yield of it is 65% based on the weight of reactants.

*Example 2*

Phenol _____ 94.11 gms. (1.0 mol)
Formaldehyde (36.4% by wt. aqueous solution) _____ 99.00 gms. (1.2 mol)
Water _____ 92.41 gms. (5.13 mol)
Sodium hydroxide (25% by wt. aqueous solution) _____ 11.29 gms. (0.071 mol)

This mix is condensed at reflux for thirty minutes and then treated in a similar manner to that described in Example 1. The yield of crude creamy powder was roughly 100%.

*Example 3* p,p'Dihydroxy diphenyl propane _____ 228.30 gms. (1.00 mol)
Formaldehyde (36.4% by wt. aqueous solution methanol-free) _____ 300.90 gms. (3.65 mol)
Water _____ 75.22 gms. (4.17 mol)
Sodium hydroxide _____ 22.57 gms. (0.14 mol)

These are mixed, heated to reflux and condensed at reflux for 7 minutes. The yellow, practically clear solution resulting therefrom (which clouds upon cooling) is tested for free formaldehyde (3.4%). 17.29 gms. (0.24 mol) of beta-propiolactone are added and the sample refluxed another 3 minutes, acidified with 18.97 gms. (0.11 mol) of lactic acid (51% by wt. aqueous solution). The sample, now cloudy, is dehydrated at 80° C. under reduced pressure until no bubbling is observed when the pressure is raised to 40 mms. The sample is then dehydrated an additional ten minutes and poured (yield 2.21). The yellow, clear liquid of normal pouring viscosity yields a yellow, heavily translucent casting of hardness +50. A similar sample, unmodified by beta propiolactone, could not be poured (yield 1.96).

LIQUID RESINS

The following examples illustrate the preparation of liquid or castable resins and cured products made therefrom.

In these examples also the composition of the mixes used are tabulated.

*Example 4*

Phenol _____ 94.11 gms. (1.00 mol)
Formaldehyde (37% by wt. aqueous solution contg. methanol as stabilizer) _____ 188.22 gms. (2.32 mol)
Sodium hydroxide solution (25% by wt.) _____ 11.29 gms. (0.07 mol)

These are mixed, heated to reflux, and refluxed seventeen minutes. Reflux is then discontinued and 12.97 gms. (0.18 mol) of beta-propiolactone introduced into the clear yellow solution. The sample is again refluxed one minute followed by cooling to room temperature.

The resulting solution is water-white, clear and possesses a pH of 5.35. This is placed in a water-bath at 80° C. and dehydrated under reduced pressure until no further bubbling is observed when the pressure is 40 mm. The yield (grams of product per gram of phenol employed initially) is 1.92.

The thin, water-white, clear liquid is poured into a glass mold and subjected to a cure of forty-two hours at 90° C. The casting thus formed upon removal from the mold is white, very heavily translucent, and of Rockwell hardness +35.

When the beta-propiolactone in the above preparation is replaced by 8.62 gms. (0.096 mol) of lactic acid, a water-white, clear liquid (yield 1.80) is obtained, the viscosity of which is considered normal for comparison and this upon curing forty-two hours at 90° C. forms a white, opaque casting of a hardness +43.

Example 5

A mix of the same composition as Example 4 is heated to reflux and condensed at reflux for seventeen minutes. At the end of this time, it is modified with 17.29 gms. (0.24 mol) of beta-propiolactone and again refluxed one minute. It is then cooled to room temperature and a pH adjusted to 4.30 by the addition of a 51% by weight aqueous solution of lactic acid. The sample is then dehydrated until a constant yield (1.96) is obtained and the slightly thin, water-white, clear liquid poured into a glass mold and cured for forty-seven hours at 90° C. A lightly opaque, white casting of hardness +2 is formed.

Example 6

A mix of the same composition as Example 4 is heated to reflux and condensed at reflux for seventeen minutes. This is then acidified with 8.62 gms. (0.096 mol) of lactic acid (added in the form of a 51% by weight aqueous solution) and dehydrated at 80° C. under reduced pressure until rapid onset in viscosity begins (corresponds to approximately no bubbling when pressure is raised to 50 mms.) and then for twenty minutes longer. At this point 30.27 gms. (0.42 mol) of beta-propiolactone are mixed intimately with the liquid and the sample subjected to an additional five minutes dehydration. The thin, water-white, clear liquid (yield 2.0) thus obtained is poured into a glass mold and cured for fifty hours at 90° C. A white, lightly translucent casting results. (Hardness —9.)

Example 7

A mix of the composition of Example 4 is heated to reflux and condensed at reflux for seventeen minutes. This is acidified immediately to a pH of 4.5 with lactic acid solution (1.12 specific gravity) and dehydrated at 80° C. under reduced pressure until the yield becomes constant (1.78) at this point 4.32 gms. (0.06 mol) of beta-propiolactone is mixed in and the sample again dehydrated for fifteen minutes (yield 1.82). The slightly thin, water-white, clear liquid is poured into a glass mold and cured forty-two hours at 90° C. A white (blue tint), opaque casting results. (Hardness +49.)

Example 8

Glycerine and titanium dioxide are incorporated in this preparation. For convenience, they are used in the proportion of fifty parts by weight of the dioxide to fifty parts by weight of the glycerine.

A mix of similar composition to Example 1 is heated to reflux and condensed at reflux for seventeen minutes. At this point the pH is immediately adjusted to 4.5 employing lactic acid solution of specific gravity 1.12. Dehydration is begun and interrupted after fifty minutes at which point 28.2 ml. of a titanium dioxide paste in glycerine is added and the dehydration is then continued. When no bubbling is observed at 40 mm. at 80° C., the dehydration is stopped. 64.85 gms. (0.90 mol) of beta-propiolactone is mixed in and the water-thin, milky white sample thus formed (yield 2.5) is poured into a mold. The sample is then cured seventy-two hours at 90° C. The resulting casting is white, opaque, extremely soft and displays better stability to light than a similar sample unmodified with beta-propiolactone.

Example 9

A mix of the composition of Example 4 is heated to reflux, condensed seventeen minutes at reflux and treated with 19.46 gms. (0.27 mol) of beta-propiolactone. The sample is then refluxed one minute, cooled to room temperature and the pH measured (pH 5.07) 12.6 gms. (0.14 mol) of glycerine is then added at this point and the sample dehydrated at 80° C. until no bubbling is observed when the pressure is made 40 mm. at 80° C. The very thin, water-white, clear liquid (yield 1.98) is poured into a glass mold and cured for forty-two hours at 90° C. The finished casting is water-white, transparent (slight haze), and has a hardness of —39.

Example 10

Phenol _____ 94.11 gms. (1.00 mol)
Formaldehyde (35.2% by wt. aqueous solution, methanol-free) _____ 188.22 gms. (2.21 mols)
Sodium hydroxide (25% by wt. aqueous solution) _____ 11.29 gms. (0.07 mol)

These are mixed, heated to reflux, and condensed at reflux for twenty-one minutes. The heat is removed and 43.24 gms. (0.60 mol) of beta-propiolactone are added through the top of the condenser at a rate just sufficient to maintain reflux. (Total reflux time seventeen minutes.) The sample is then cooled and 2.15 gms. (0.024 mol) lactic acid added and the sample dehydrated under reduced pressure at 80° C. until no bubbling is observed when the pressure is raised to 40 mm. (yield 2.15). The slightly thin, water-white, clear liquid thus obtained is poured into a mold and cured for sixty-two hours at 90° C. A transparent casting of hardness +17 results. This casting displays a definite haze.

Example 11

Phenol _____ 94.11 gms. (1.00 mol)
Formaldehyde (35.2% by wt. aqueous solution, methanol-free) _____ 188.22 gms. (2.21 mol)
Sodium hydroxide (25% by wt. aqueous solution) _____ 11.29 gms. (0.07 mol)

These are mixed, heated to reflux and condensed at reflux for twenty-one minutes. 25.94 gms. (0.36 mol) of beta-propiolactone is then added and the sample refluxed an additional twenty minutes. 14.76 gms. (0.084 mol) of lactic acid in the form of a 51% by weight aqueous solution is introduced producing a milky white sample. This sample is dehydrated at 80° C. until no bubbling is observed when the pressure is raised to 40 mms. and yields a very heavy, water-white, clear liquid (yield 2.03). The casting produced from this (cured 45 hrs. at 90° C.) is transparent (with a definite haze) and possesses a hardness of +57.

Example 12

Phenol _____ 94.11 gms. (1.00 mol)
Formaldehyde (36.4% by wt. aqueous solution, methanol-free) _____ 188.22 gms. (2.28 mol)
Sodium hydroxide (25% by wt. aqueous solution) _____ 11.29 gms. (0.07 mol)

These are mixed, heated to reflux and condensed at reflux for twenty-one minutes. 25.94 gms. (0.36 mol) of beta-propiolactone are added and the solution is then condensed an additional twenty minutes. The sample becomes milky white when the reflux is stopped. 16.9 gms. (0.53 mol) of methanol is added at this point and the sample again refluxed twenty minutes. The sample remains milky white throughout. The sample is cooled and the pH measured (pH 4.64). 14.76 gms. (0.084 mol) of lactic acid (51% by wt. aqueous solution) are then added and the sample dehydrated under reduced pressure at 80° C. until no bubbling is observed when the pressure is raised to 40 mm. A water-white, clear liquid (yield 1.96) is obtained which is just pourable. Upon curing five days at 75° C. a water-white, transparent (very definite haze) casting of +13 hardness is produced.

Example 13

Phenol _____ 94.11 gms. (1.00 mol)
Formaldehyde (36.4% by wt. aqueous solution, methanol-free) _____ 188.22 gms. (2.28 mol)
Sodium hydroxide (25% by wt. aqueous solution) _____ 11.29 gms. (0.07 mol)
Methanol _____ 33.88 gms. (1.06 mol)

These are mixed, heated to reflux and condensed at reflux for twenty minutes. The sample is cooled to room temperature at this point and 19.01 gms. (0.48 mol) of sodium hydroxide added (in form of 25% by wt. aqueous solution). The deep yellow, clear solution originating is then treated with 34.59 gms. (0.48 mol) of beta-propiolactone, the latter being added slowly with stirring and the temperature being held at room temperature by cooling. An off-white suspension results. The addition of 18.28 gms. (0.20 mol) of lactic acid causes separation (color now white, pH 5.6). This is dehydrated at 80° C. under reduced pressure and the sample gradually clears during this step. When it becomes slightly thin-normal in viscosity (yield 2.42) the off-white clear liquid is poured into a glass mold and cured for 40 hours at 90° C. The casting is orange brown, translucent, and possesses a hardness at +43. A sample similarly prepared without the secondary caustic addition and acidified with 8.60 gms. (0.096 mol) of lactic acid (pH 4.7) yields a white, opaque casting (hardness +48).

Example 14

A mix of the composition of Example 12 is heated to reflux and condensed fifteen minutes at reflux. The heat is removed and 17.29 gms. (0.24 mol) of beta-propiolactone is added at a rate to just maintain reflux and refluxing continued for a total of eighteen minutes. The mix is then acidified with 12.23 gms. (0.080 mol) of mandelic acid and dehydrated until no bubbling is observed at 40 mm. and 80° C. The water-white, clear, slightly thin to thin liquid (yield 1.99) is poured into a glass mold and cured for 1 day at 90° C. The casting is water-white, transparent and possesses a hardness of −9.

Example 15

A preparation similar to Example 14 is made in which the mandelic acid is replaced by 14.12 gms. (0.079 mol) of hippuric acid. The liquid at pour is thin to slightly thin and the yield 2.01. The casting is tinted pink, is transparent, and exhibits a hardness of −24.

Example 16

A preparation similar to Example 14 is made in which the mandelic acid is replaced by 10.54 gms. (0.081 mol) of itaconic acid. The liquid is thin to slightly thin at pour and the yield is 1.97. The casting formed is water-white, lightly opaque and has a hardness of +14.

Example 17

Phenol _____ 94.11 gms. (1.00 mol)
Formaldehyde (36.4% by wt. aqeous solution, methanol-free) _____ 188.22 gms. (2.28 mol)
Benzyl trimethyl ammonium hydroxide (19.14% in phenol solution) _____ 51.43 gms. (0.59 mol)

These components are mixed (pH 8.27), heated to reflux and condensed at reflux for forty-four minutes. The heat is removed and 34.59 gms. (0.48 mol) of beta-propiolactone added at a rate just sufficient to maintain reflux (total reflux—forty-seven minutes). 15.81 gms. (0.09 mol) of lactic acid (as 51% by wt. aqueous solution) is added and the sample dehydrated in the usual manner until no bubbling is observed at 40 mm. and 80° C. (yield 2.15). The liquid at pour is water-white, clear and very thin. The casting is water-white, transparent (definite haze), and possesses a hardness of −31 after a cure of 40 hrs. at 90° C. A sample unmodified with beta-propiolactone yields a thin to slightly thin liquid which forms an off-colored, heavily translucent casting of +25 hardness (yield 1.73).

Example 18 p,p′Dihydroxydiphenylpropane _____ 228.28 gms. (1.00 mol)
Formaldehyde (36.4% by wt. aqueous solution, methanol-free) _____ 300.86 gms. (3.65 mol)
Sodium hydroxide (25% by wt., aqueous solution) _____ 75.22 gms. (0.47 mol)
Water _____ 22.56 gms. (1.25 mol)

These are mixed, heated to reflux and condensed at reflux for seven minutes. The yellow, practically clear solution resulting therefrom (which clouds upon cooling) is tested for free formaldehyde (3.4%). 17.29 gms. (0.24 mol) of beta-propiolactone are added and the sample refluxed another three minutes. The system is acidified with 18.97 gms. (0.11 mol) of lactic acid (51% by wt. aqueous solution) and the sample, now cloudy, dehydrated at 80° C. under reduced pressure until no bubbling is observed when the pressure is raised to 40 mm. The sample is then dehydrated an additional ten minutes and poured (yield 2.21). The yellow, clear liquid of normal pouring viscosity yields a yellow, heavily translucent casting of hardness +50. A similar sample unmodified by beta-propiolactone, could not be poured (yield 1.96).

Example 19

Resorcinol _____ 110.11 gms. (1.00 mol)
Water _____ 17.30 gms. (0.96 mol)
Methanol _____ 48.00 gms. (1.50 mol)
Sodium hydroxide (25% by wt. aqueous solution) _____ 8.00 gms. (0.05 mol)

These are mixed and heated to reflux at which point 48.7 gms. (0.60 mol) of 37% by wt. aqueous solution of formaldehyde (containing methanol stabilizer) are added, the addition being made over a period of 5–10 minutes. The reflux is continued after the formaldehyde addition has been completed until sixty minutes have elapsed from the start of reflux. The heating is then discontinued and 36.03 gms. (0.50 mol) of beta-propiolactone added at a rate just sufficient to maintain reflux and the reflux continued after this addition until a total reflux time of sixty-seven minutes is noted. The product is a brown solution, immiscible with further water, of pH 4.3.

The addition to this solution of paraform in amount to raise the resorcinol-formaldehyde ratio to 1:1.3 produces a composition which does not gel within a period of one week at room temperature; a sample, unmodified with beta-propiolactone treated in an analogous manner gels in 8 hours.

Example 20

Phenol _____ 94.11 gms. (1.00 mol)
Furfural _____ 120.10 gms. (1.25 mol)
Sodium hydroxide (20% by wt. aqueous solution) _____ 12.00 gms. (0.06 mol)

The mix is condensed for 145 minutes at 110°–115° C. At the end of this period 36.03 gms. (0.5 mol) of beta-propiolactone are added and the sample again heated at 110°–115° C. for 20 minutes (pH 5.4). Separation occurs upon cooling. The resin layer is much thinner in viscosity than that from an unmodified sample (pH 9.7).

Modifications of Above Examples

Example 21

The method of any of the Examples 1–20 is repeated except that the phenol used is any one or a mixture of any selected from the group consisting of phenol, cresol, xylenol, guaiacol, p,p′-dihydroxydiphenylpropane, p,p′dihydroxydiphenyl, and 1,5-dihydroxynaphthalene. The selected phenol is used in proportion chemically equivalent to the phenol replaced.

Example 22

Phenol-aldehyde resins in which the usual formaldehyde reagent has been replaced by paraform, trioxane, hexamethylene tetramine, glyoxal, acetaldehyde or furfural may be modified by beta-propiolacetone as set forth in Examples 1–19 and 21.

Example 23

A product made as described in Example 2 and in the acidic form containing carboxylic groups COOH is mixed with ethylene glycol, diethylene glycol, glycerine, pentaerythritol, or like polyhydric alcohol and warmed to remove water of esterification with the polyhydric alcohol.

In one embodiment, the polyhydric alcohol is used in the proportion of 1 mol to 1 mol carboxylic acid group in the resin product of the Example 1. In a modification the proportion of the polyhydric alcohol is made 1 to 2 equivalents for each carboxyl group in the resin. Esters result.

The finished esters are solid or viscous products suitable for use as varnish and paint making resins.

In a modification, the procedure of this example is repeated except that the polyhydric alcohol is esterified with the lactone modified product that is made as described in any of the examples above and is in uncured condition.

Example 24

The procedure of any of the Examples 1–23 is followed except that the lactone there used is replaced by an equivalent proportion of beta-butyrolactone or beta-isobutyrolactone or a mixture of them with each other or of either or both of them with beta-propiolactone.

It will be understood that it is intended to cover all changes and modifications of the examples of the invention herein shown for the purpose of illustration which do not constitute departures from the spirit and scope of the invention.

What I claim is:

1. In making a resinous composition, the method which comprises maintaining phenol in contact with formaldehyde, in the proportion of approximately 0.8 to 2.5 mols for 1 mol of the phenol, alkali and water, until condensation occurs to give a water soluble condensation product and until the content of free formaldehyde ceases to fall rapidly; then introducing into the resulting water soluble condensation product a lactone selected from the group consisting of beta-propiolactone, beta-butyrolactone, and beta-isobutyrolactone, in the proportion of 0.1 to 1 mol of the lactone for 1 mol of the phenol used, and a water soluble alkali in amount if any required to establish the pH of the resulting mixture at a level at least as high as 4; introducing the said alkali in additional amount if any required from time to time to maintain the pH at the said level; and continuing the contact of the said condensation product, lactone and alkali until reaction in the mixture practically ceases.

2. The method of claim 1 in which the lactone used is beta-propiolactone.

References Cited in the file of this patent

UNITED STATES PATENTS

| Number | Name | Date |
|--------|------|------|
| 1,805,385 | Voss | May 12, 1931 |
| 2,449,991 | Gresham | Sept. 28, 1948 |
| 2,571,120 | De Groote | Oct. 16, 1951 |

FOREIGN PATENTS

| Number | Country | Date |
|--------|---------|------|
| 439,962 | Germany | Jan. 20, 1927 |